United States Patent [19]
Cinibulk et al.

[11] Patent Number: 5,894,035
[45] Date of Patent: Apr. 13, 1999

[54] METHOD OF FORMING TUBULAR INCLUSIONS IN SINGLE CRYSTAL ALUMINA

[75] Inventors: Michael K. Cinibulk, Bellbrook; Randall S. Hay, Beavercreek, both of Ohio

[73] Assignee: The United States of America as represented by the Secretary of the Air Force, Washington, D.C.

[21] Appl. No.: 08/846,608

[22] Filed: Apr. 30, 1997

[51] Int. Cl.$^6$ .............................. B05D 3/02; C23C 16/00
[52] U.S. Cl. .......................... 427/226; 427/255; 264/620; 264/621; 264/640
[58] Field of Search ................................. 264/620, 621, 264/640, 641; 427/226, 255

[56] References Cited

U.S. PATENT DOCUMENTS

| | | | |
|---|---|---|---|
| 5,573,718 | 11/1996 | Shih et al. | 264/56 |
| 5,575,964 | 11/1996 | Umezaki et al. | 264/60 |

OTHER PUBLICATIONS

Michael K. Cinibulk and Randall S. Hay, "Textured Magnetoplumbite Fiber–Matrix Interphase Derived from Sol–Gel Fiber Coatings", J. Am. Ceram. Soc., 79|5], 1233–46 (1996), published May 1996.

Primary Examiner—Christopher A. Fiorilla
Attorney, Agent, or Firm—Charles E. Bricker; Thomas L. Kundert

[57] ABSTRACT

A method of making a mechanically stable, fiber having an inclusion of ion-conducting material which includes the steps of coating a single-crystal or polycrystalline α-alumina fiber with a zirconia or a hexaluminate precursor, optionally heating the coated fiber to dry the coating, when the coating is applied as a suspension or sol, heating the coated fiber to a temperature of about 1000° to 1800° C. to promote the growth of alpha-alumina toothlike extensions in the coating and epitaxial formation of the zirconia or hexaluminate on the sides of the extensions, embedding the fiber in an α-alumina matrix material, and heating the resulting fiber-matrix composite to react and texture the coating and densify the assembly.

8 Claims, 4 Drawing Sheets

METHOD OF FORMING TUBULAR INCLUSIONS IN SINGLE CRYSTAL ALUMINA

RIGHTS OF THE GOVERNMENT

The invention described herein may be manufactured and used by or for the Government of the United States for all governmental purposes without the payment of any royalty.

BACKGROUND OF THE INVENTION

The present invention relates to a method of making alumina fibers having continuous tubular inclusions of ceramic material, which impart improved strength and ionic conductivity at high temperatures.

It is well known that beta-aluminas possess the property of ion conductivity. Beta-aluminas have long been used as solid electrolytes in sodium-sulfur batteries. We have discovered a method for preparing alumina fibers with a continuous inclusion of material having ionic conductivity, such that the conductive inclusion is insulated from the surrounding environment.

One object of the present invention is to produce continuous tubular inclusions of ceramic material in an alumina fiber so that the resulting fiber is useful as a mechanically stable high-temperature sensor for various ionic species, or as ionic conductors or fiber optic waveguides.

This and other objects of the invention will be apparent to those skilled in this art from the following detailed description of a preferred embodiment of the invention.

BRIEF SUMMARY OF THE INVENTION

In accordance with the present invention there is provided a method of making a mechanically stable, fiber having an inclusion of ion-conducting material which comprises the steps of coating a single-crystal or polycrystalline α-alumina fiber with a hexaluminate precursor, optionally heating the coated fiber to dry the coating, when the coating is applied as a suspension or sol, heating the coated fiber to a temperature of about 1000° to 1800° C. to promote the growth of alpha-alumina toothlike extensions in the coating and epitaxial formation of the hexaluminate on the sides of the extensions, embedding the fiber in an α-alumina matrix material, and heating the resulting fiber-matrix composite to react and texture the coating and densify the assembly.

BRIEF DESCRIPTION OF THE DRAWINGS

The invention will be further described in connection with the accompanying drawings, in which.

DETAILED DESCRIPTION OF THE INVENTION

The fiber of the invention and the method of fabricating this fiber are shown schematically in FIGS. 1 through 6.

Figure 1:
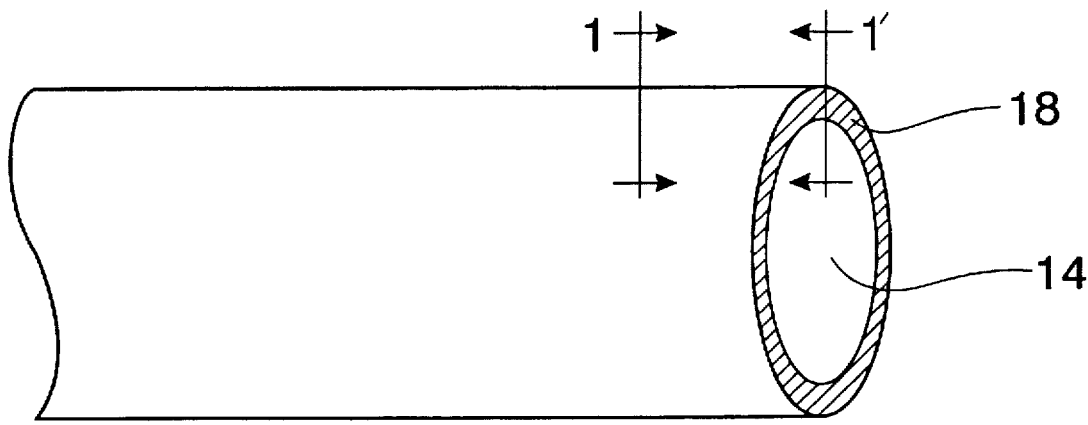
FIG. 1 is a schematic illustration of a single ceramic fiber having a coating applied thereto.

As a first step in fabricating the fiber of this invention, a single-crystal or polycrystalline α-alumina fiber 14 is first coated with a hexaluminate precursor 18, as shown in FIG. 1. These precursors comprise spinel layers $(Al_{11}O_{17})^-$ interleaved with a variety of weaker layers such as $(M'O)^-$ where M' is an alkali metal, Ba, Ag or Tl, or $(M''AlO_3)^-$ where M" is an alkaline-earth or rare-earth metal or Pb. The precursor can be in the form of an aqueous sol or suspension or a metal-organic precursor or a gaseous precursor. Calcium hexaluminate, $CaAl_{12}O_{19}$ (the mineral hibonite), while not conducting, is particularly suitable as an illustration as a fiber coating in the method of the present invention because of its high-temperature stability, ease of formation, and thermochemical stability with alumina up to as high as 1833° C.

FIGS. 2 through 6 illustrate, in cross-section, the sequence of events during texture development of hibonite coating deposited on a single crystal alumina fiber and sintered or hot-pressed in an alumina matrix.

Figure 2:
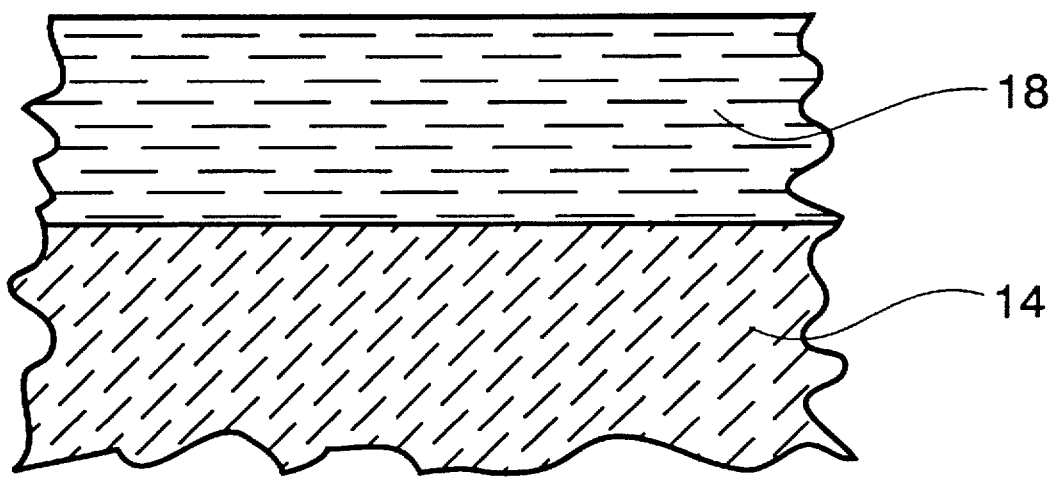
FIG. 2 is a cross-section taken through section 1-1' of FIG. 1 showing the fiber coating applied as a sol.

In FIG. 2, an alpha-alumina ($\alpha$-$Al_2O_3$) fiber 14 is coated with an aqueous suspension, or sol, of hibonite ($CaAl_{12}O_{19}$) 18, which gels to a mechanical mixture of colloidal alumina and calcia.

Figure 3:
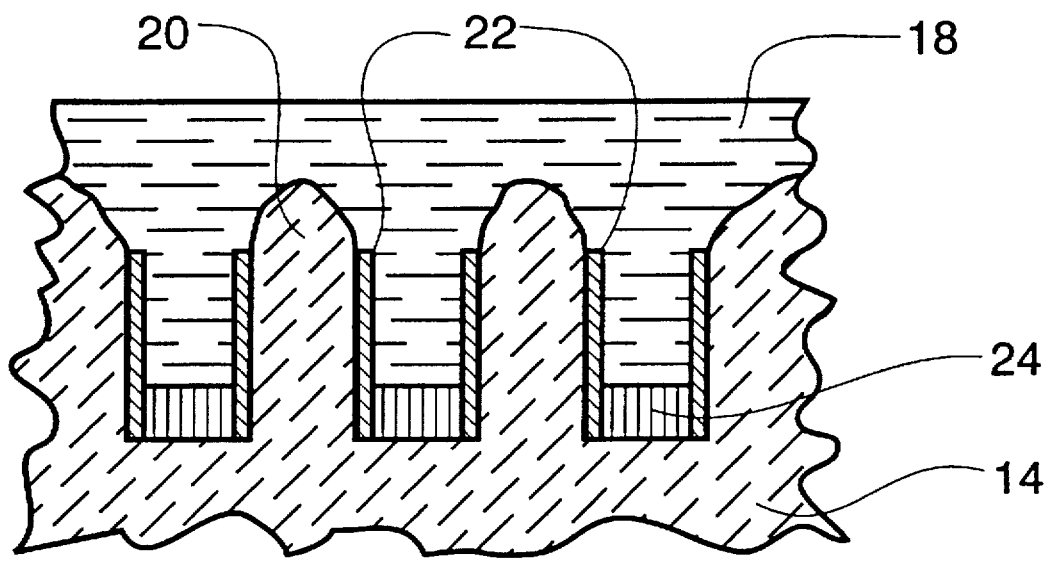
FIG. 3 is a cross-section taken through section 1-1' of FIG. 1 illustrating the alpha-alumina toothlike extensions syntactically seeded by the fiber at about 1200° as the coating is fired.

In FIG. 3, as the coated fiber 14 is fired to a temperature above about 600° C., the liquid evaporates while transition-alumina ($Al_2O_3$) particles gel and the Ca-salt precipitates and decomposes to an oxide (CaO or Ca-rich aluminate). When the coated fiber 14 is heated further to a temperature of about 1000° to 1800° C., the alpha-alumina fiber 14 epitaxially seeds the transition-alumina-alpha-alumina phase transformation, or alpha-alumina toothlike extensions 20 in the coating 18. Hibonite, $CaAl_{12}O_{19}$, eventually forms epitaxially 22 on the sides of the alumina extensions 20. Calcia (CaO) diffuses away from the transformation front and enriches the unseeded areas, forming calcium dialuminate 24.

Figure 4:
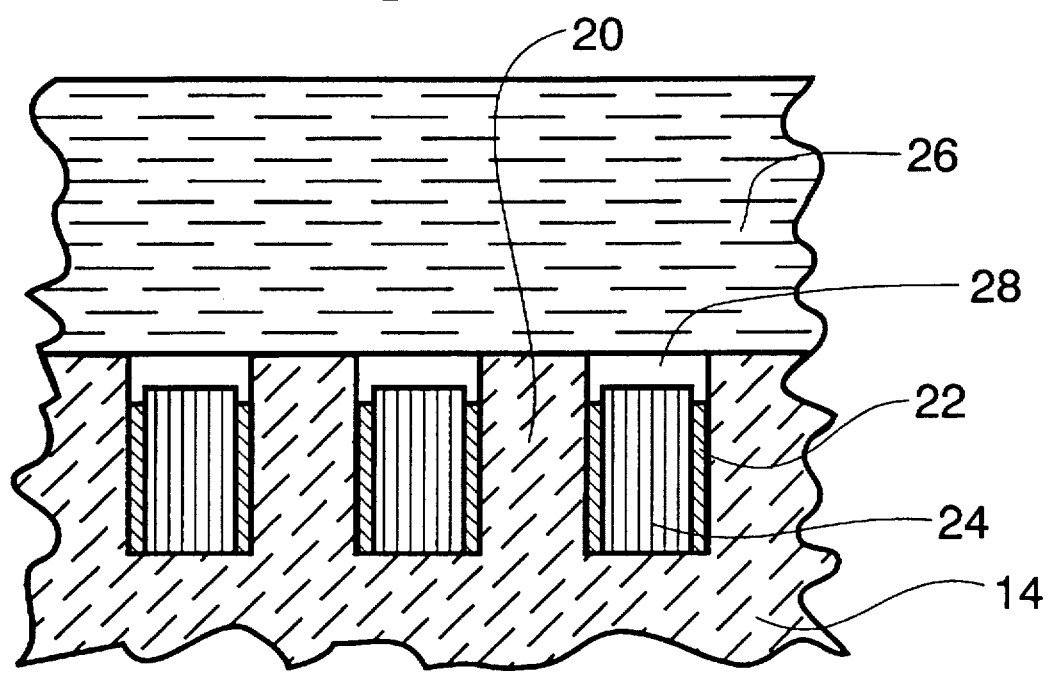
FIG. 4 is a cross-section taken through 1-1' of FIG. 1 illustrating the completed formation of syntactic alumina extensions following fiber coating, and the densification of the coated fibers in alpha-alumina powder matrix material.

In FIG. 4, formation of the syntactic alumina extensions 20 is complete and the fiber 14 is sintered or hot-pressed in an alpha-alumina powder matrix 26. Calcium dialuminate 24, epitaxial hibonite 22 and an amorphous calcium aluminosilicate phase 28 form between the extensions 20.

Figure 5:
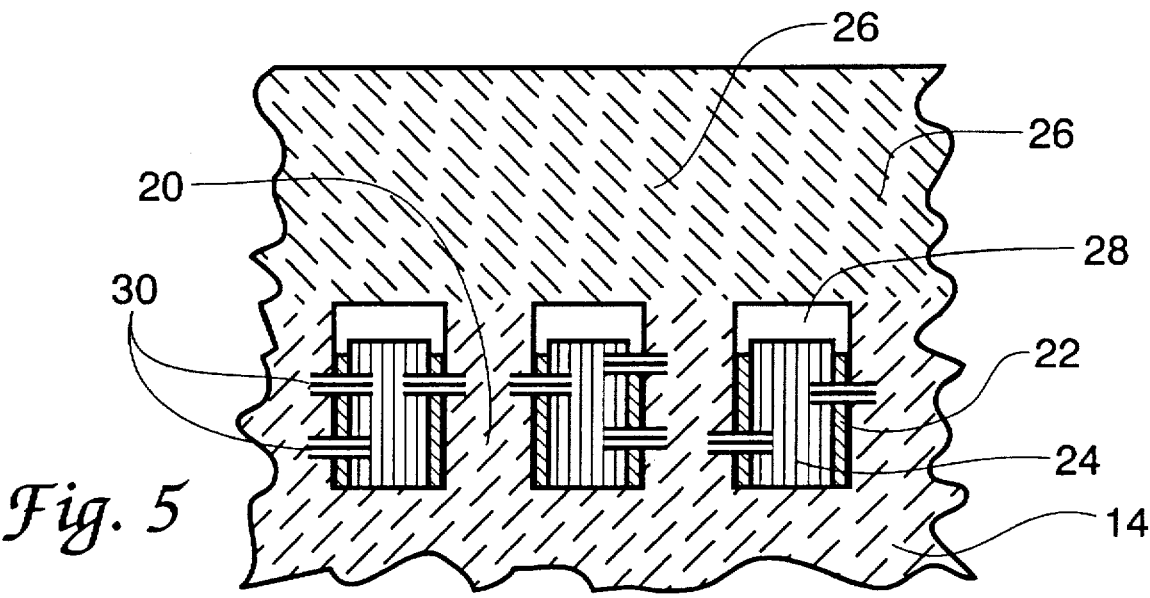
FIG. 5 is a cross-section taken through 1-1' of FIG. 1 illustrating the seeding of abnormal grain growth of the alumina matrix with basal planes parallel to the reaction path and fiber surface, during densification of the coated fibers in the powder matrix material.

In FIG. 5, during sintering or hot-pressing, and as the fiber-matrix composite is heated to a temperature sufficient to completely calcine the coating, the syntactic alumina extensions 20 seed abnormal grain growth of the alumina matrix 26, resulting in growth of the fiber 14 through the coating and into the matrix 26. Calcium dialuminate 24 and the calcium-rich amorphous phase 28 react with the syntactic alumina extensions 20 to form hibonite grains 30 with basal planes parallel to the surface of the fiber 14.

Figure 6:
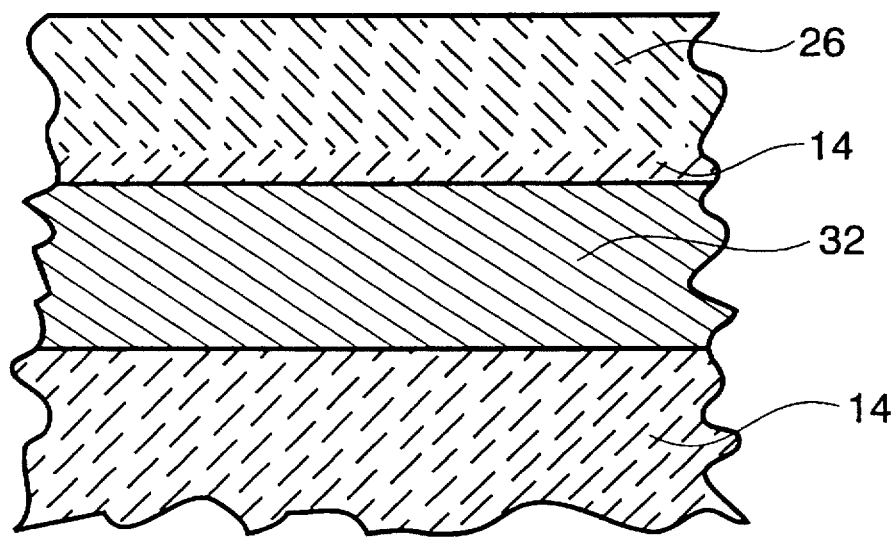
FIG. 6 is a cross-section taken through 1-1' of FIG. 1 illustrating the continuing abnormal grain growth in the alumina matrix and interphase, leaving tubular inclusions of basal-textured ceramic material inside an enlarged alumina fiber.
Figure 7:
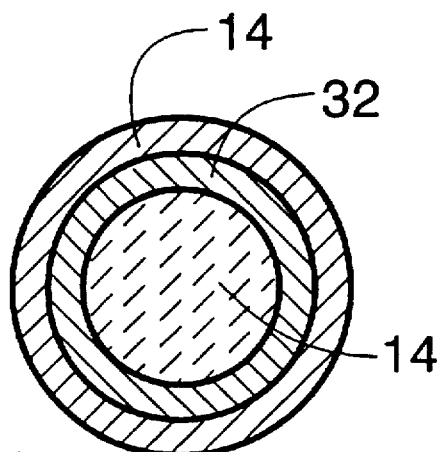
FIG. 7 is an end view of a single fiber showing a tubular inclusion inside the fiber.

In FIG. 6, abnormal grain growth continues, leaving a tubular polycrystalline inclusion 32 of basal textured hibonite inside an enlarged single-crystal alumina fiber 14. The completed fiber is shown in FIG. 7.

Figure 8:
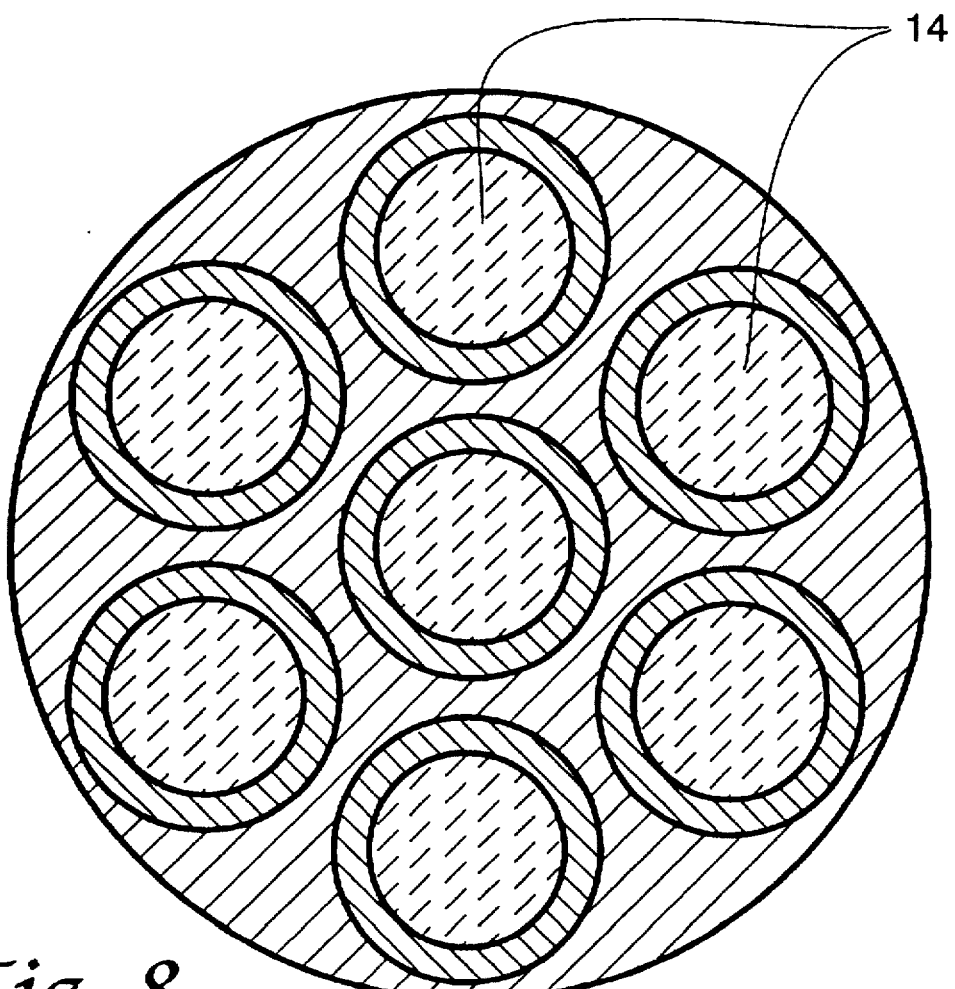
FIG. 8 is an end view of an embodiment of the invention wherein a plurality of fibers, each having a tubular inclusion of basal-textured material, are incorporated into a composite structure.

It is within the scope of this invention to combine a plurality of the fibers of this invention in a composite structure. Referring to FIG. 8, a plurality of fibers 14 is coated with a hexaluminate precursor and treated, as described previously, then sintered or hot-pressed in an alpha-alumina matrix, as described previously. The resulting composite structure has a plurality of fibers, each having a tubular inclusion of basal-textured material.

Other phases that are compatible with alumina, such as $ZrO_2$, Pd and Pt, may be substituted for the CaO. These phases do not react to form an aluminate with alumina. The phase transformation to alpha-alumina will proceed around particles of these phases without diffusion of Zr, Pd or Pt.

The fibers of this invention can be employed as high-temperature ionic conductors for sensors in harsh environments. The continuous tubular inclusion in a single crystal alumina provides greater strength at high temperatures than cylindrical monoliths of the same material.

The following example illustrates the invention:

EXAMPLE

Hibonite Sol Preparation and Fiber Coating $CaAl_{12}O_{19}$ (hibonite) sols were prepared by addition of calcium acetate to a diluted commercial boehmite sol (DISPERAL Sol 10/2, CONDEA Chemie GmbH, Hamburg, Germany). Final sol concentrations were between 50 g/l and 10 g/l.

Single-crystal c-axis oriented $\alpha$-$Al_2O_3$ fibers, about 135 µm in diameter (Saphikon, Inc.) were desized and coated with the $CaAl_{12}O_{19}$ sols using a continuous fiber-coating apparatus. The coating apparatus consisted of a vessel containing the sol and a tube furnace to dry and calcine the applied sol, aligned vertically in series. The hot-zone of the furnace was about 8 cm long. Fibers were intially passed through the about 1100° C. furnace at 40 mm/s in air to burn off the polymeric sizing. The fibers were then passed continuously through the sol at 40 mm/s and into the furnace at about 1450° C. Multiple passes were needed to get a coating of the order of 1–2 µm thick. Past experience with relatively inviscid sols suggests that for monofilaments the coating thickness is roughly proportional to sol yield and nearly independent of pull rate. Smaller sections of coated fiber were also heat treated at 1500° C. for 30 min in air, while others were heated to 1400° C. and held at temperature for just 1 min to obtain an intermediate microstructure to observe phase and microstructure development in the coating. Selected coated fibers were examined by X-ray diffraction, light microscopy, SEM, and TEM prior to incorporation in an $Al_2O_3$ matrix. Petrographic thin sections of coated fibers embedded in epoxy were prepared with longitudinal orientation. TEM specimens were made from the diamond polished thin sections by argon-ion milling.

Composite Processing and Microstructural Characterization

The coated fibers were hot-pressed in a matrix of high-purity $\alpha$-$Al_2O_3$ powder (AKP-53, Sumitomo Chemical Co., Osaka, Japan) using a 2 in.×2 in. square graphite die at 1500°–1550° C. for 20 min under 25 MPa uniaxial stress in vacuum to obtain a unidirectional 2–5 fiber-vol % composite. The matrix was doped with 0.5 wt % CaO to prevent loss of CaO from the $CaAl_{12}O_{19}$ fiber coating. Composites were characterized by light microscopy, SEM, and TEM. Petrographic thin sections were prepared by mechanically thinning a section of the composite normal to the fiber axis, using diamond abrasives; this resulted in a specimen with many fibers that could then be then attached to a Cu grid and argon-ion milled to electron transparency for TEM examination.

RESULTS—PHASE AND MICROSTRUCTURE DEVELOPMENT

Hibonite-Coated Alumina Fibers

An SEM image of a cross-section of a fractured fiber showed an about 1 µm thick coating. EDS of the coating gave a Ca:Al ratio close to 1:12, confirming a bulk composition close to $CaAl_{12}O_{19}$. Fiber coating thicknesses were 1–2 µm for fibers that made 8 passes through the coater at 4 cm/s with a 60 g/l sol. X-ray diffraction of coated fibers was complicated by intense peaks from the alumina fiber that masked subtle peaks from the thin coating. Micrographs were made of the top surfaces of coated fibers taken with secondary electrons in the SEM and with light transmitting through the diameter of the fiber in crossed polarizers. The coating on an as-coated fiber had domains of contrast arising from the retardation of light as it passed through regions in the coating in different crystallographic orientations. The same coated fiber imaged with secondary electrons showed a globular coating morphology. Individual grains could not be resolved with this technique. The coating on a fiber following subsequent annealing by pulling the coated fiber through the furnace at 1 mm/s at about 1650° C., contained large grains of hibonite, with diameters of 0.5–2 µm and aspect ratios of up to 20, which were clearly resolved by both light microscopy and SEM. Coated fiber annealed at 1500° C. for 2 h produced a coating similar in morphology to that pulled a second time through the coater furnace. Coated fiber annealed at 1400° C. for 1 min resulted in a coating consisting of a microstructure with features found in both as-coated fibers and fully annealed fibers.

TEM micrographs of an as-coated fiber, with the fiber axis normal to the electron beam, showed a toothed microstructure with about 100–200 nm wide $\alpha$-$Al_2O_3$ teeth. Hibonite grains with a large amount of basal plane grew epitaxially on the $Al_2O_3$ teeth with an $(0001)_h | (0001)_a, \{1010\}_h | \{1210\}_a$ orientation relationship, with basal planes perpendicular to the fiber surface. The teeth were inferred to be circumferentially continuous around the fiber, thus presenting a large area for (0001) epitaxy. $CaAl_4O_7$ and a Ca-rich amorphous or nanocrystalline aluminate were also observed between the $\alpha$-$Al_2O_3$ gear teeth. The small fraction of $CaAl_4O_7$ observed in the 500 nm of coating adjacent to the fiber usually remaining upon ion-beam thinning implies that a higher fraction mu-, have been present in the outer portion of coating that was milled away, to preserve overall CaO mass balance. Moreover, $CaAl_4O_7$ grains were usually observed at the edge of the foil and not close to the fiber surface. The amount of amorphous phase did not increase with time of exposure to the electron beam, and had higher concentrations of Si and Ca than hibonite and calcium dialuminate; therefore, it is not believed to be an artifact of radiation damage. In the as-coated fibers, the basal planes of syntactic hibonite were oriented normal to the fiber axis and were not aligned with the fiber surface.

The only coating phase present in fibers heat-treated at 1500° C. for 2 h was hibonite. The hibonite was textured so that the basal planes were parallel to the fiber surface; this was perpendicular to the epitaxial orientation observed in the as-coated fibers. The coatings on fibers held at 1400° C. for just 1 minute had features in common with both the as-coated and 1500° C. heat-treated fibers. An amorphous intergranular phase rich in Ca and with trace Si was detected by diffuse dark-field imaging and EDS.

Formation of Tubular Inclusions

The composite had an alumina matrix doped with 0.5 wt % CaO to counter loss of CaO from the coating to the matrix. Evidence of CaO in the composites could be seen in the form of abnormal growth of $Al_2O_3$ grains in an elongated tabular morphology. A continuous 1–2 µm thick layer of hibonite was observed alone all fiber-matrix interfaces by optical microscopy. In cross-polarized transmitted light the extinction band in the hibonite layer moved around the circumference of the fiber as the stage rotated, which suggested a texture with hibonite c-axes at a constant angle to the fiber surface. TEM images show that the hibonite grains were elongated (typically 2–4 mm long, 0.2–0.5 mm wide) and textured so that the elongated directions were aligned parallel to the interface. Electron diffraction and lattice fringe (0002) images confirmed that the direction of elongation contained the basal cleavage planes, that these planes were in the plane of the fiber-matrix interface, and that the texture observed by polarized light was due to alignment of the hibonite c-axis with the fiber radius (basal texture). In some cases the hibonite basal planes were parallel to (2110) planes of the alumina fiber. Despite presence of the coating, abnormal grain growth was still seeded in the alumina matrix by the fiber. The resulting composite contained single-crystal alumina fibers that were radially enlarged by abnormal grain growth in the matrix, but with a tubular inclusion of textured polycrystalline hibonite marking the original fiber-matrix interface inside the single-crystal alumina.

In polished longitudinal sections, cross-sectional cracks through the fiber and coating were observed spaced every few millimeters along the length of the fibers. Most of the cracks extended 0.5–1 fiber-diameters into the matrix. The small crack openings (<2 µm), absence of matrix between the fracture surfaces, and the extension into the matrix suggested that the cracks occurred during cooling after consolidation by hot pressing. A far fewer number of cracks with much larger (about 100 µm) openings were also observed. These did not extend into the matrix, and matrix was forced into the crack opening, which suggested that these cracks formed before or during composite consolidation. While the uncoated alumina along fresh crack surfaces could have seeded the abnormal grain growth in the matrix, the abundance of such cracks was not nearly sufficient to account for the extent of the seeded abnormal grain growth.

Furthermore, cracks that formed after hot-pressing would not have seeded abnormal grain growth, so the seeding must have occurred during hot-pressing and before complete formation of hibonite at an intermediate stage of the fiber-coating phase evolution.

While a preferred form of the invention has been shown in the drawings and described, since variations in the preferred form will be apparent to those skilled in the art, the invention should not be construed as limited to the specific form shown and described, but instead is as set forth in the following claims.

We claim:

1. A method of making an alpha-alumina fiber having an inclusion of ion-conducting material, comprising the steps of (a) providing an alpha-alumina fiber;

(b) coating said fiber with a hexaluminate precursor;

(c) heating said fiber to a temperature of about 1000° to 1800° C. to promote the growth of alpha-alumina extensions into said coating, said extensions having sides, and epitaxial formation of said hexaluminate on the sides of said extensions;

(d) providing an alumina matrix material;

(e) embedding the coated fiber in said matrix material; and (f) heating the thus-embedded coated fiber to calcine said precursor coating, whereby the epitaxial alpha-alumina in the coating seeds abnormal grain growth in the matrix, resulting in growth of the fiber through the coating and into the matrix, and whereby hexaluminate grains with basal planes parallel to the surface of the fiber form and become tubular inclusions of basal textured hexaluminate inside the resulting enlarged alumina fiber.

2. The method of claim 1, wherein said alpha-alumina fiber is a single crystal alpha-alumina fiber.

3. The method of claim 1, wherein said alpha-alumina fiber is a polycrystalline alpha-alumina fiber.

4. The method of claim 1, wherein said hexaluminate precursor coating is applied as a liquid, and further comprising the step of drying said coating prior to step (c).

5. The method of claim 4, wherein said precursor coating liquid is a sol.

6. The method of claim 5, wherein said precursor coating liquid is a hibonite sol.

7. The method of claim 4, wherein said precursor coating liquid is a solution.

8. The method of claim 1, wherein said precursor is applied as a gas.

* * * * *